United States Patent [19]
Narlo

[11] Patent Number: 5,090,910
[45] Date of Patent: Feb. 25, 1992

[54] MULTIPLE THREE DIMENSIONAL FACIAL DISPLAY SYSTEM

[76] Inventor: Jeanie R. Narlo, Rte. 4, Cumberland Rd., Tyler, Tex. 75703

[21] Appl. No.: 569,782

[22] Filed: Aug. 23, 1989

Related U.S. Application Data

[63] Continuation of Ser. No. 257,827, Oct. 14, 1988, abandoned.

[51] Int. Cl.$^5$ .............................................. G09B 19/00
[52] U.S. Cl. ..................................... 434/82; 446/100; 434/270; 434/377; 434/100
[58] Field of Search ................... 434/82, 86, 94, 219, 434/256, 270, 271, 377, 100; 446/100, 369, 391

[56] References Cited

U.S. PATENT DOCUMENTS

| | | | |
|---|---|---|---|
| 129,086 | 7/1872 | Benda | 446/391 |
| 1,263,307 | 4/1918 | Barler | 446/100 |
| 1,762,374 | 1/1930 | Yancey | 446/100 |
| 1,868,209 | 7/1932 | Käpernick | 434/271 |
| 1,942,370 | 3/1934 | Jacobson | 434/365 |
| 2,058,856 | 10/1936 | Diehl | 434/365 |
| 2,063,561 | 12/1936 | Sofo | 434/82 |
| 2,309,390 | 3/1941 | Grossguth et al. | 434/94 |
| 2,327,059 | 6/1943 | Pal | 446/391 |
| 2,778,125 | 1/1957 | Hantman | 434/270 |
| 2,831,286 | 4/1958 | Eisner | 434/82 X |
| 2,919,502 | 1/1960 | Henry | 434/94 |
| 3,009,265 | 11/1961 | Bezark | 434/270 |
| 3,061,880 | 11/1962 | Weisbach | 434/270 |
| 3,210,884 | 10/1965 | Sharff et al. | 446/100 |
| 3,213,550 | 10/1965 | Kittner | 434/273 |
| 3,464,146 | 9/1969 | McCurdy | 446/100 |
| 4,045,883 | 9/1977 | Ryan | 434/155 |
| 4,112,614 | 9/1978 | Clokey | 446/391 |
| 4,209,919 | 7/1980 | Kirikae et al. | 434/270 |
| 4,579,537 | 4/1986 | Leahy | 446/100 |
| 4,596,528 | 6/1986 | Lewis et al. | 434/270 |
| 4,644,591 | 2/1987 | Goldberg | 446/369 |

FOREIGN PATENT DOCUMENTS

| | | | |
|---|---|---|---|
| 1297337 | 5/1962 | France | 434/100 |
| 423200 | 1/1935 | United Kingdom | 446/100 |
| 465877 | 4/1937 | United Kingdom | 446/391 |
| 1768 | 5/1937 | United Kingdom | 446/100 |

Primary Examiner—Richard J. Apley
Assistant Examiner—L. Thomas
Attorney, Agent, or Firm—Nixon & Vanderhye

[57] ABSTRACT

A mutable three-dimensional facial display system is provided, constructed with a plurality of molded components constructed of a rubbery polymer or plastic material, and chosen to resemble the texture of human skin. Each component includes at least one defined structural edge which mates with adjacent components. Various alternatively shaped components are provided for each primary region of the facial display, so that seven classic face shapes and numerous hybrid variations thereof may be recreated.

18 Claims, 5 Drawing Sheets

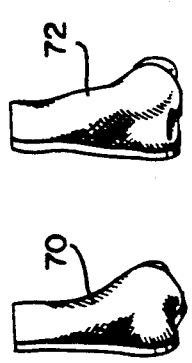
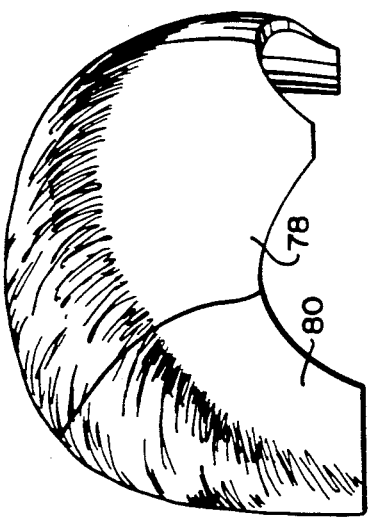
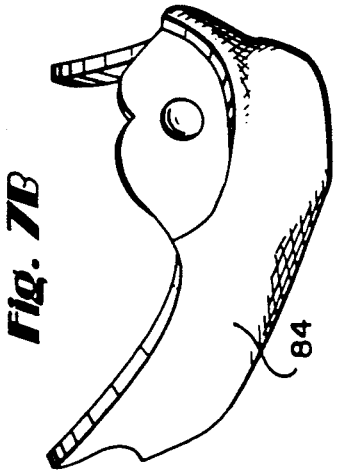
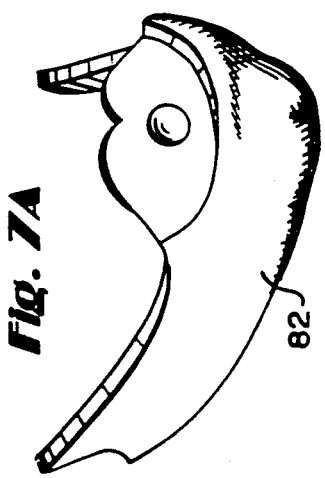
Fig. 5A  Fig. 5B  Fig. 6A  Fig. 6B  Fig. 7A  Fig. 7B

MULTIPLE THREE DIMENSIONAL FACIAL DISPLAY SYSTEM

This is a continuation of application Ser. No. 07/257,827, filed Oct. 14, 1988, now abandoned.

BACKGROUND AND SUMMARY OF THE INVENTION

This invention relates to a three-dimensional facial model in general and, in particular, to a mutable three-dimensional facial model adapted to enable a user to recreate seven classic or basic facial shapes as well as numerous hybrid facial shapes. The device is intended to be used primarily for cosmetic and style training, but it will be appreciated that it has many other uses, e.g., in criminology, motion picture work, in the medical field as a reconstructive surgery display, or in any any area where it is desirable to have a capability of creating facial structures in three dimensions.

Facial displays which permit a user to modify various portions of the facial structure to provide a wide variety of facial shapes and expressions are well known in the prior art. For example, some facial display systems utilize two dimensional drawings or overlays to derive the desired facial shape and expression, such as those disclosed in U.S. Pat. Nos. 4,045,883 and 2,919,502. Police agencies and other organizations frequently utilize systems of this sort in conjunction with eyewitness testimony to provide a composite drawing of a face which may be useful in identification of an individual being sought by such agencies.

Three-dimensional facial model systems are less common due to the difficulties involved in providing sufficient mutability to portray a multitude of facial shapes and characteristics. One example of a known mutable three-dimensional facial display system includes a rigid substrate covered in whole or in part with sculptor's modeling clay which can be manually deformed, or sculpted, to slightly vary the facial shape of the model. However, this system does not in any way permit easy recreation of numerous facial shapes by the assembly of preformed and interchangeable facial components; nor does it permit the variation of certain facial characteristics such as brow types or eye placement.

Other three-dimensional models are similarly limited in terms of overall flexibility and versatility in the creation of facial displays. For example, in U.S. Pat. Nos. 3,464,146; 3,210,884; 2,327,059; 2,058,856; and 1,762,374, there are disclosed three-dimensional doll or figure heads which include one or more interchangeable or selectable facial parts utilized merely to create different facial expressions. These devices to not have the capability, however, of recreating facial shapes corresponding to different facial bone structures.

Faces are generally classified as one of the following classic facial shapes: round, oval, square, oblong, triangle, inverted triangle and diamond. Each of these seven classic shapes is created by distinct bone structure which visually distinguishes one from the other. There are, of course, many facial shapes which do not fall squarely into any of the above categories, but are, in effect, hybrids having features found in two or more of these seven classic shapes.

It is very important, therefore, that any facial display system which will be utilized, for example, to train individuals in the proper use of cosmetics, be mutable over a broad range of facial shapes and characteristics. Since the application of cosmetics is significantly affected (in terms of both location and amount) by the facial structure, there exists a real need for a display system which enables a user to recreate quickly and accurately a wide range of facial shapes consistent with real life experience, utilizing a resilient skin like texture which is amenable to repeated application and removal of cosmetic substances for experimentation and training purposes.

The present invention provides a three-dimensional, mutable facial display system which enables the user to recreate the seven classic facial shapes as well as numerous variations thereof from a plurality of three-dimensional parts which may be interchangeably mounted on a skull base portion.

More specifically, it has been discovered that a three-dimensional facial model can be subdivided into seven components, including the forehead, temples, cheeks, nose, eyes, jawlines and mouth. Of these components, the forehead, temples, cheeks and jawlines are significant or primary to the creation of face shapes per se, while the nose, eyes, and mouth serve to individualize the primary shape. Accordingly, this invention provides alternative components not only for the primary components, but also for the secondary components, any one or more of the latter being useable with each of the seven classic face shapes and hybrids or variations thereof. By providing interchangeable variations of each of these components, it will be appreciated that literally hundreds of faces may be created with the display system of this invention.

It has further been discovered that certain of the primary components are common to more than one of the seven classic shapes, thus permitting certain economics in the manufacture of the facial display system.

In one exemplary embodiment of the invention, a three-dimensional and self-supporting skull base is provided which is adapted to receive three-dimensional facial components on a forward facing mounting surface. The mounting surface is provided with an irregular contour which is adapted to frictionally receive the various components, so that separate attachment means generally are not needed. It will be appreciated, however, that suitable fastener means may be employed to detachably mount the facial components on the skull base if desired.

It is also a feature of the present invention that adjacent components have mating structural edges which minimize the visibility of such edges when the various components are assembled in place. In this regard, it will be appreciated that the mating structural edges are the same for each set of components. In other words, and by way of example, the structural edges of alternative jawline components are identical to each other, and are designed to mate with the structural edges of the alternative mouth components (which are also identical to each other). Thus, any one of the alternative jawline components may be used with any one of the mouth components. This same identity of structural edges among the various groups of components assures, with only a few exceptions as noted further herein, precise and mating engagement of any set of components chosen for mounting on the skull base.

It will thus be readily apparent to those skilled in the art that the various components may be interchanged as desired to create a closer resemblance to a particular face which does not otherwise closely conform to one of the seven classic shapes.

In the exemplary embodiment, the facial display components are constructed of molded sections comprising preferably a rubbery polymer or plastic material chosen to resemble the texture of the human skin.

While the invention is designed for use primarily in a learning environment such as a studio, beauty parlor, school, hospital, police agency or the like, it will be appreciated that the facial display system disclosed herein may also be manufactured in kit form for consumer use at home, as an instructional game for example.

Additional objects and advantages of the invention will become apparent from the detailed description which follows.

BRIEF DESCRIPTION OF THE DRAWINGS

FIGS. 5A and 5B are perspective views of exemplary alternative nose components in accordance with the invention;

FIGS. 6A and 6B are perspective views of exemplary alternative forehead and temples components in accordance with the invention; and FIGS. 7A and 7B are perspective views of exemplary alternative jawline components in accordance with the invention.

DETAILED DESCRIPTION OF THE DRAWINGS

Figure 1:
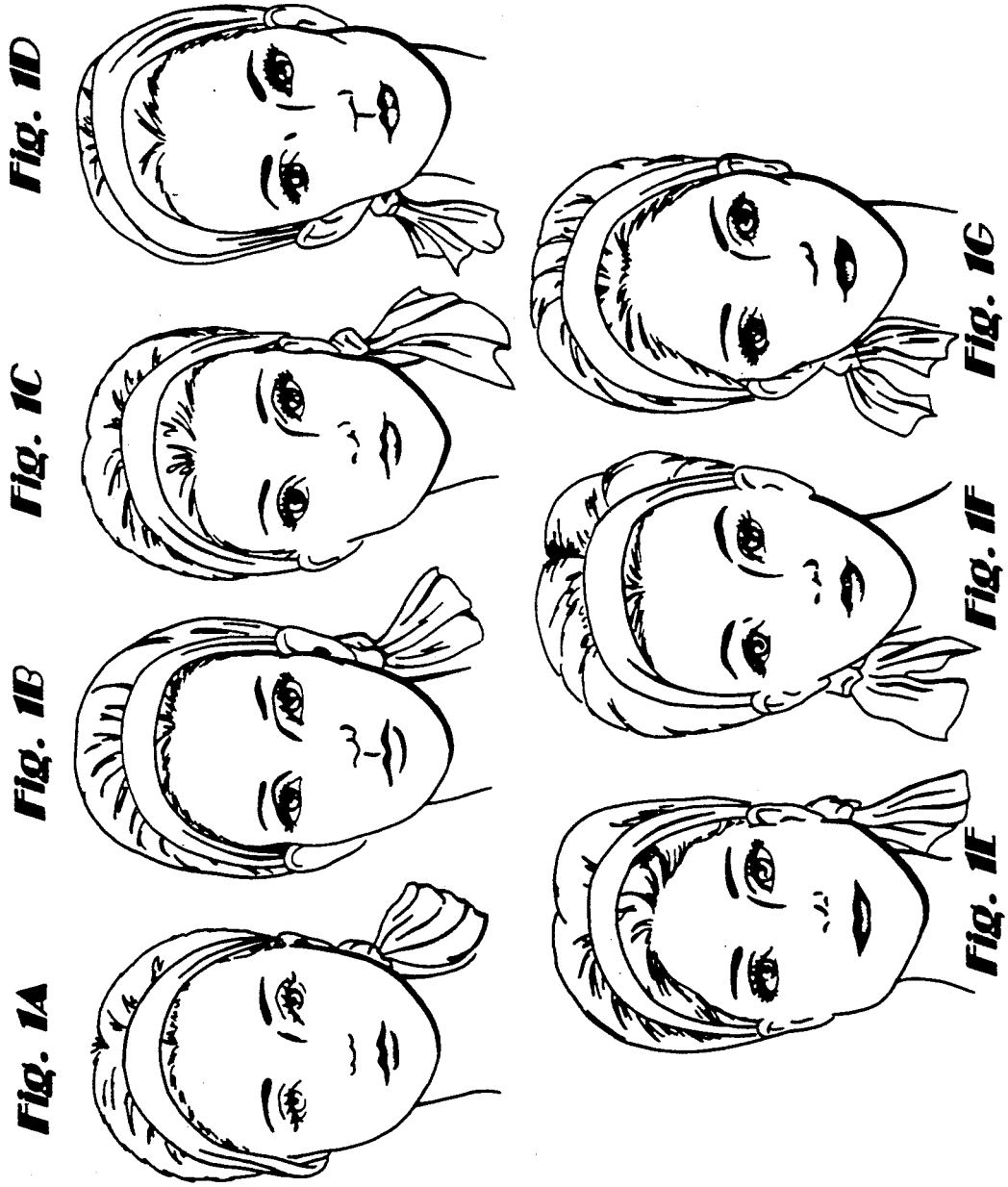
FIGS. 1A–1G are sketches of the seven classic face shapes.

With reference now to FIG. 1, there are illustrated what are commonly regarded as the seven classic face shapes. Each shape is determined to a large extent by the facial bone structure and each has its own unique characteristics. More specifically, FIGS. 1A through G illustrate, respectively, the round, oval, square, oblong, triangle, inverted triangle and diamond face shapes.

Typical dimensions and characteristic lines for each face shape are noted in the Table below:

| shape | widest point | length-to-width relationship | characteristic lines |
|---|---|---|---|
| round | Cheeks | Width usually more than ⅔ of length | Rounding Lines: Hairline usually rounded; cheeks are rounded and usually full down to a rounded chin. |
| oval | Forehead | Width usually about ⅔ of length | Rounding Lines: Hairline usually curved; face gently tapers from forehead down to a curved chin. |
| square | Forehead, cheeks and jaw almost equal | Width usually more than ⅔ of length | Straight Lines: Hairline usually straight; line from temple to cheeks and jaw rather straight; jaw angular; chin squared. |
| oblong | Forehead, cheeks and jaw almost equal | Width ⅔ or less than ⅔ of length | Straight Lines: Hairline often straight; line from temple to cheeks and jaw rather straight; jaw angular; chin squared. |
| triangle | Jaw | Width usually more than ⅔ of length | Straight Lines: Hairline often irregular; face moves in rather straight line from narrow forehead to wide jaw; jaw and chin line squared. |
| inverted triangle | Forehead | Width usually more than ⅔ of length | Straight Lines: Hairline usually rather straight; face moves from forehead to narrow jaw and pointed or sometimes receded chin in rather straight lines. |
| diamond | Cheeks | Width usually more than ⅔ of length | Straight Lines: Hairline often irregular, moving in straight, diagonal lines down the side of the face to wide cheekbones. Line from cheek to jaw and chin rather straight; chin may be long and pointed or short and receded. |

Figure 2:
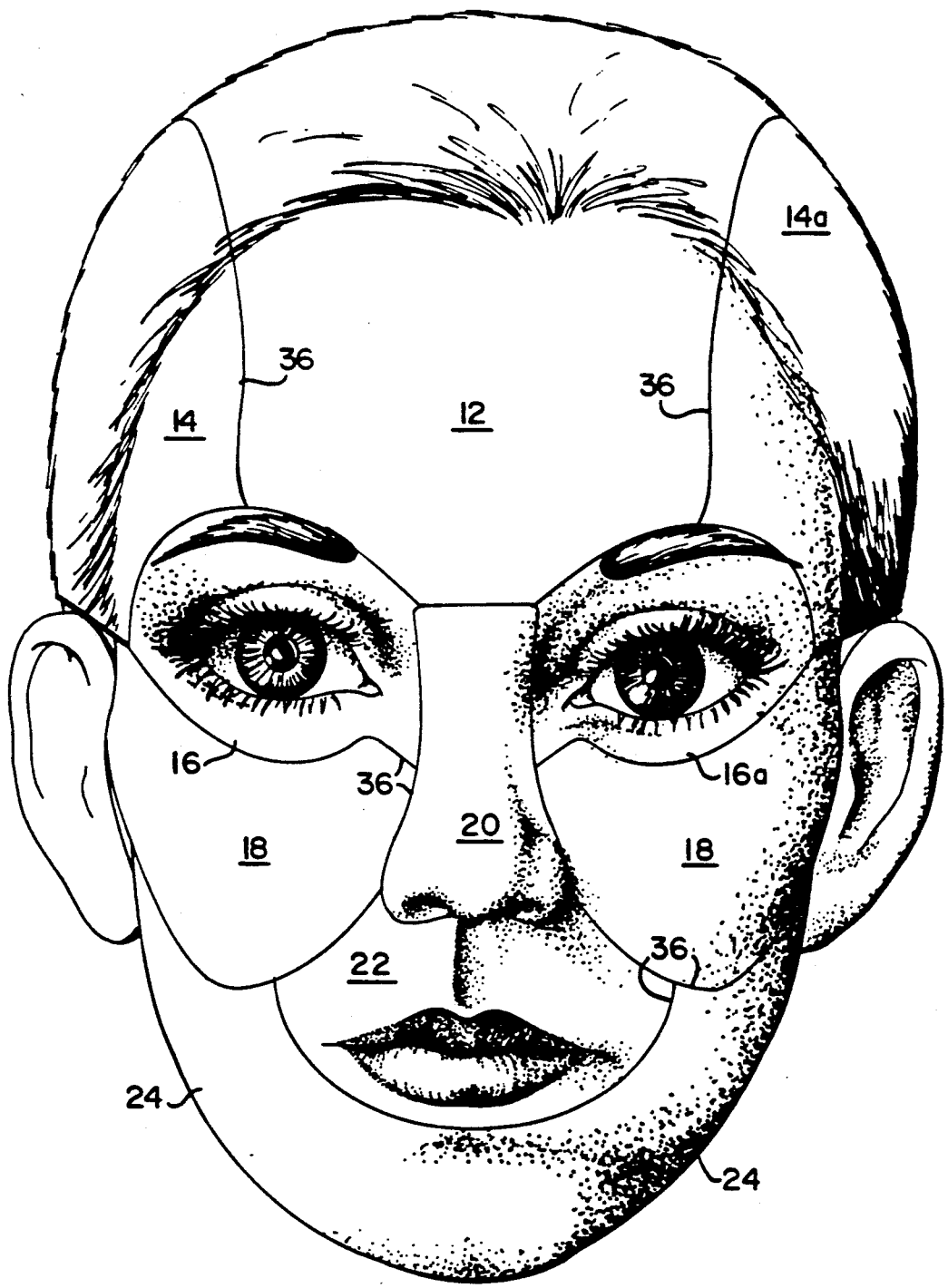
FIG. 2 is a front view of the three-dimensional facial display of this invention in assembled form.
Figure 3:
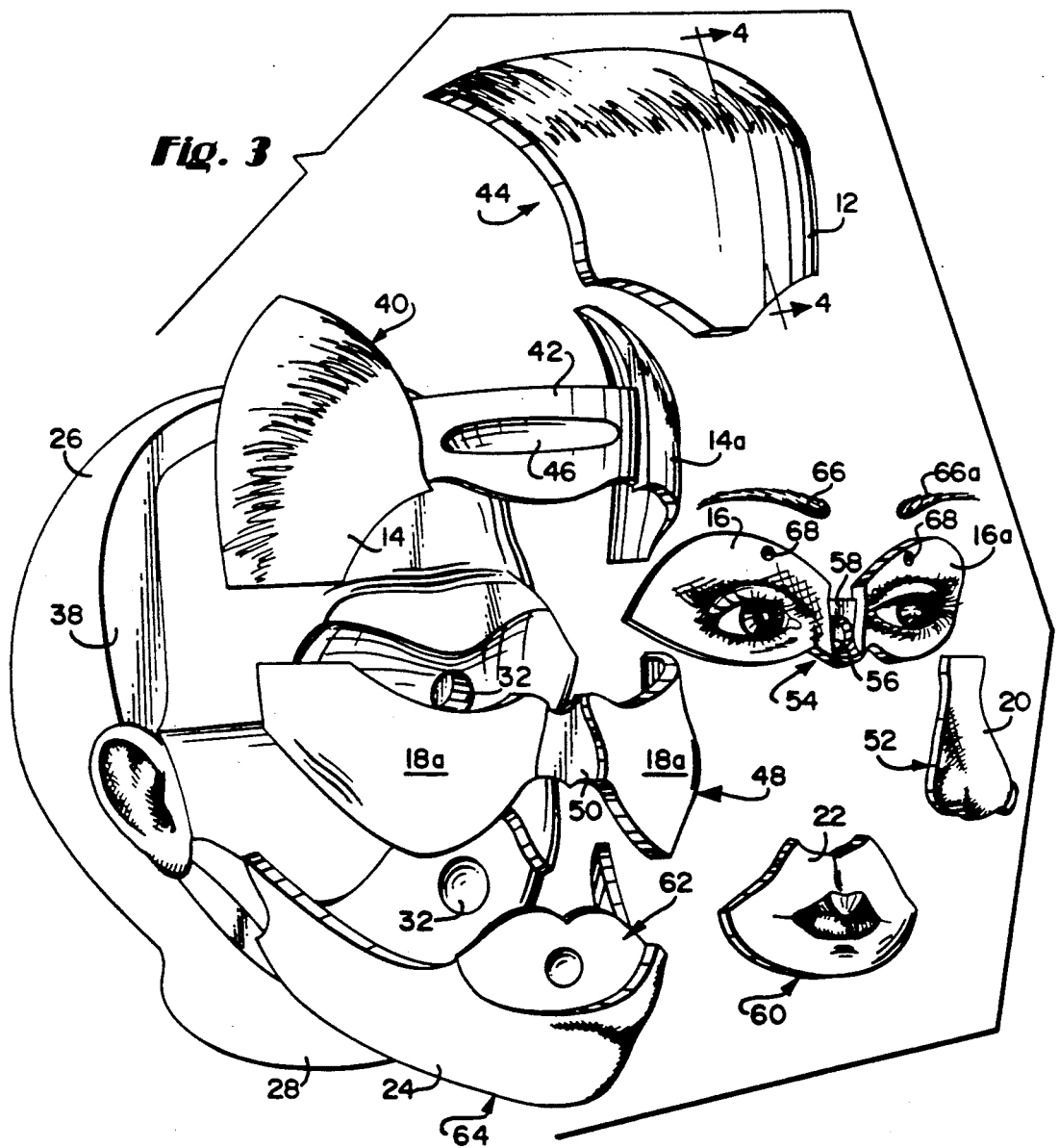
FIG. 3 is an exploded view of the three-dimensional facial display system of the present invention.

In accordance with the present invention, and with reference to FIGS. 2 and 3, I provide a three-dimensional model not numbered with sufficient components to enable recreating at least each of the seven classic face shapes shown in FIG. 1, as well as numerous hybrid variations thereof. In order to accomplish this task, the face in general has been divided into the following regions as best seen with reference to the components shown in FIG. 2: the forehead 12; the temples 14, 14a; the eyes 16, 16a; the cheeks 18, 18a; nose 20, mouth and lips 22, and jawlines (including the chin) 24. As will be explained below, each set of two temples, two cheeks, and two eyes, respectively, may be formed as single components.

As will also be explained in greater detail below, alternatively shaped three-dimensional facial display components are provided for each of the above sections.

FIG. 3 illustrates in exploded form the assembly of the various components required to create a first facial display corresponding to one of the seven classic face shapes, (or a hybrid thereof) as shown in FIG. 2. A skull base 26 constructed of plastic, hard rubber, plaster, or other suitable material is utilized as a support for the various facial display components. The base 26 is preferably but not necessarily shaped generally to resemble the back of a human head, and is formed with a flat bottom surface 28 which enables the base to be self-supporting. The angle of inclination of surface 28 relative to an upright head may be chosen to provide the desired inclination of the facial display.

Figure 4:
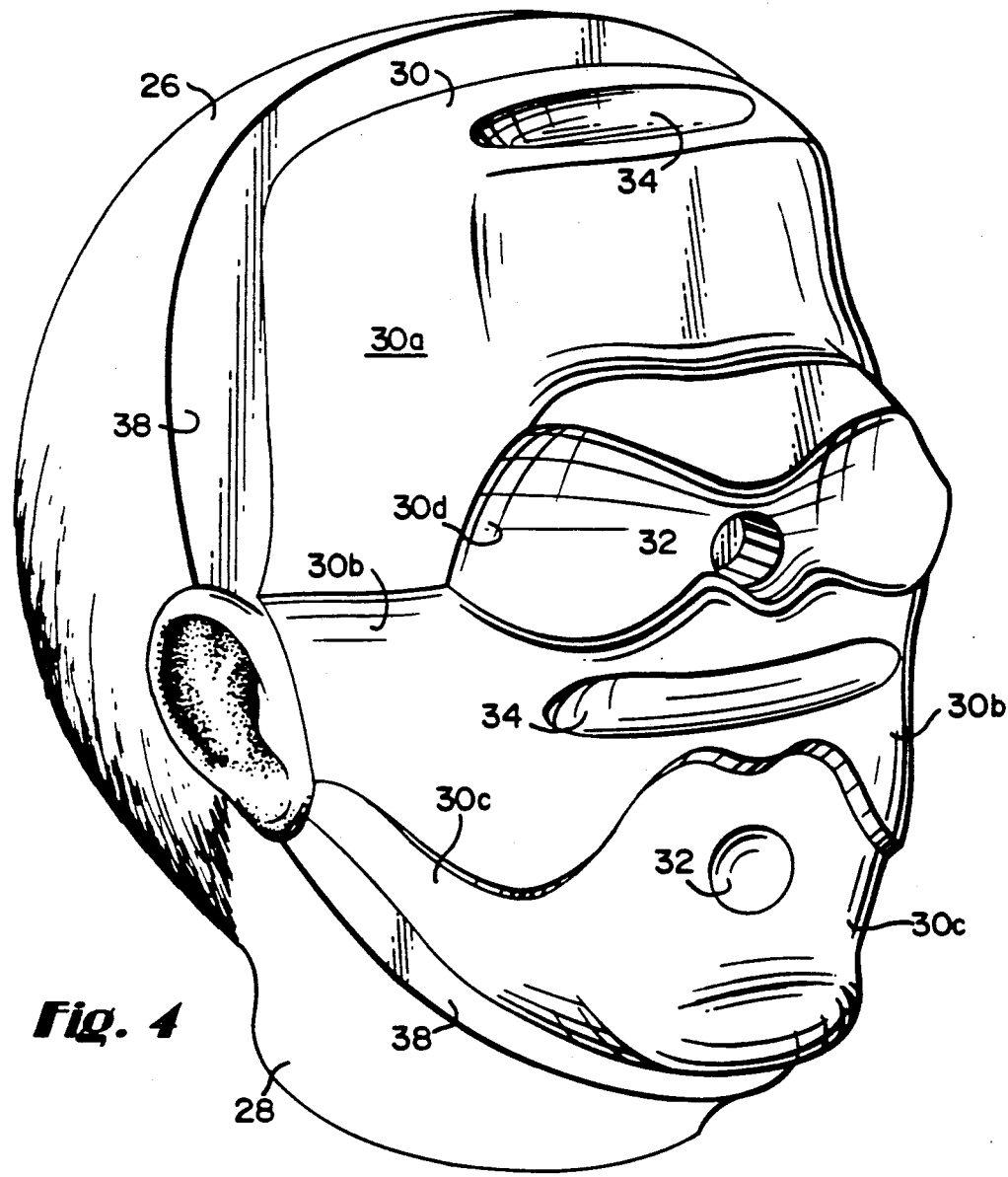
FIG. 4 is a perspective view of the skull base portion of the display system in accordance with the invention.

The forward portion of the base is formed with a contoured support surface 30, best seen in FIG. 4, which is especially adapted to temporarily mount the various shaped facial display components. In other words, the contoured supported surface 30 includes area 30a which provides underlying support for the forehead component 12; areas 30b which provide underlying support for the cheeks component 18, 18a; areas 30c which provide underlying support for the jawbones component 24; and area 30d which provides underlying support for the eyes component 16, 16a. To this end, a plurality of mounting holes 32 or groove-like depressions 34 are provided in the supporting surface for receiving complimentary projections on the corresponding components.

The use of mounting holes and complimentary projections, 32, 34 along with the specially contoured configurations of surface 30 permits the various components to attached to the base 26 without the need for any separate fastening means. At the same time, surface 30 is contoured, in conjunction with the rearward facing contours of the various components, to insure a flush fit between the components. The mounting surface 30 is delineated from the remainder of the skull base 26 by a substantially vertical wall portion 38, against which the temples, cheeks and jawline components abut.

As may be appreciated from FIGS. 2 and 3, the components of any given facial display are also provided with mating or complimentary structural edges 36 which further enable precise and accurate interfitting engagement of the various components, so that a substantially smooth surface is provided over the whole of the facial display.

Each of the facial display components is formed as a three-dimensional member corresponding to one of the above noted facial sections. The components are preferably formed by molding a rubbery polymer or plastic material which resembles the resilient texture of human skin. Examples of suitable rubbery polymers include silicone rubber, butadiene-styrene rubber, polyvinyl chloride or latex rubber. Those of ordinary skill in the art will appreciate that various other plastics, rubbers and rubbery polymers may also be utilized to permit the three dimensional facial display system of the present invention to achieve a skin-like texture to enhance the realistic training with cosmetics which may be achieved utilizing the present invention. Of course, it is also necessary that the material be amenable to repeated application and removal of cosmetic substances in one of the principal applications of the invention, i.e., as a cosmetic training tool. Other manufacturing processes, such as casting, could also be utilized to produce the various components of the facial display.

Again, with reference to FIG. 3, it may be seen that the temples component, eyes component, cheeks component and jawlines component are formed as single pieces. Thus, the temples component 40 serves to display both temple regions 14, 14a and includes a depressed connecting or bridge portion 42 which is shaped to receive portions of the forehead component 44. In addition, the bridge connection 42 may be provided with an elongated depression 46 for receiving a complimentary projection (not shown) on the rearward surface of forehead component 44.

Similarly, the cheeks component 48 serves to display cheek regions 18, 18a, and is provided with a depressed connecting or bridge portion 50 which is adapted to receive portions of the nose component 52.

Eyes component 54 displays the eyes region 16, 16a and is mounted directly on the support surface 30 with the aid of a projection 56 formed in a bridge 58 which connects the eye regions 16, 16a, and which fits within the mounting hole 32. The connecting bridge portion 58 also provides a support surface for the nose component 52.

It will be appreciated that in order to make the eyes component 54 be as realistic as possible, "peel on" eyes may be applied to the component 54, in any desired color. Alternatively in an embodiment not illustrated in the drawings, removeable glass eyes may be inserted within cavities provided in the base 26, in conjunction with apertures provided in the eyes component 54. Since the alternative eyes components have eyes with varying lateral spacing, it is preferred that the glass eyes be adjustable within the skull base to a lateral spacing corresponding to the particular eyes component chosen for any given facial display.

The mouth component 60 displays the mouth region 22 including the lips, and may also be mounted on a support surface not numbered of a jawline component 64 which serves to display the jawlines region 24.

The mounting of these components on support surface 30 substantially completes the facial display. A number of alternative eyebrow sets, e.g., 66, 66a are also provided for use with any of the face shapes formable with the invention. To facilitate mounting of the eyebrows, pegs on the rearward side of the eyebrows are adapted to fit within apertures 68 formed on the eyes component 54.

It will also be understood that a variety of wigs may be utilized with the facial display system of this invention if desired.

As noted above, alternatively shaped components, having identical outer structural edges, are provided for each of the primary and secondary components. By way of example only, FIG. 5A and 5B illustrates a pair of alternative nose components 70, 72, respectively. It is contemplated that as many as six alternative nose shapes may be provided for use with the preferred facial display systems of this invention.

Other of the secondary components, such as the eyes, eyebrows and mouths, may also be provided in a plurality of shapes. For example, in a preferred embodiment, six sets of eyes, four sets of eyebrows and four mouth components are provided to enable a wide range of individuality in the creation of facial shapes.

FIG. 6A and 6B illustrates alternative assemblies of forehead and temples components. In FIG. 6A, a forehead component 74 is shown with a temples component 76 appropriate to form, e.g., a square face. In FIG. 6B, a forehead component 78 is shown in association with temples component 80 appropriate to form e.g., a round face.

In FIG. 7A, a jawlines component 82 is shown which may be used in the creation of, e.g., an oval face, while in FIG. 7B, a jawlines components 84 is shown which may be used in the formation of, e.g., a square face.

A sufficient number of facial components are provided to enable recreation of the seven classic face shapes. Having been apprised of the various facial shapes, and the divisions of the face into the disclosed regions, those of ordinary skill in the art will understand how to shape the various components, so that detailed drawings and descriptions of each of the alternative components need not be provided. Of course, it will be appreciated that since the various components are substantially completely interchangeable, by reason of the identical structural edges provided on alternative components of each of the respective facial regions, literally hundreds of face shapes may be created. There are only a few exceptions to the generally complete interchangeability feature of the invention. First, the temples component used to create the round face will not mate to the cheeks component used for creating the oblong face. Second, the jawlines component used to create the oblong face will not mate with the cheeks components for forming the round or square face. Otherwise, the various components are fully interchangeable.

It is also noteworthy that it is possible to use certain of the primary components for creating more than one of the seven classic face shapes. In other words, certain of the forehead, temples, cheeks and jawlines components are used in the formation of more than one of the round, oval, square, oblong, triangle, inverted triangle and diamond shapes.

More specifically, only three forehead components are required. A first forehead component is common to the round and oval shapes. A second forehead component is common to the square, oblong and inverted triangle shapes, and a third forehead is common to the triangle and diamond shapes.

Five temples components are required. Individual temples components are required for each of the round, oval and oblong shapes. A fourth temples component is common to both the square and inverted triangle shapes, and a fifth temples components is common to both the triangle and diamond shapes.

Only three cheeks components are needed for creating the seven basic face shapes. A first cheeks component is common to the square, triangle, inverted triangle and diamond shapes. A second cheeks component forms the round shape; and a third cheeks component is common to the oval and oblong shapes.

Five jawline components are required. A first forms the round shape; a second forms the oval shape; a third is common to the square and triangle shapes; a fourth forms the oblong shape; and a fifth is common to the inverted triangle and diamond shapes.

From the above, it will be appreciated that significant economies are possible in the manufacture of the facial display system. Thus, given the four primary components necessary to create the seven basic face shapes, i.e., forehead, temples, cheeks and jawlines, rather than requiring twenty eight primary components, it has been discovered that only sixteen components are needed. Of course, additional secondary components as previously described are also required.

It will thus be appreciated that the present invention provides a unique training tool or educational device, useful in a variety of fields for a variety of purposes, where there is a requirement for a capability to form or recreate numerous facial shapes in three dimensional form.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A three-dimensional facial display system for selectively creating any one of at least seven classic face shapes, each of which is characterized by a distinctive bone structure, and each of which is divided into regions including at least forehead, cheeks and jawbones regions, the system comprising:

a self supporting skill base provided with a contoured support surface;

a plurality of three dimensional facial display components corresponding to at least said forehead, cheeks and jawbones regions, each component having a front surface, rear surface and peripheral side edge, and wherein the rear surface of each of said forehead, cheeks and jawbones components is adapted to be supported directly on said contoured support surface, such that said support surface underlies each of said components, wherein said peripheral side edge of each of said components is complimentary to the peripheral side edges of adjacent components when mounted on said skull base, and wherein a sufficient number of said components are alternatively shaped and interchangeable so as to enable the formation of any one of said at least seven classic face shapes.

2. The facial display system as defined in claim 1, wherein each of said plurality of face shapes is further divided into additional regions including temples, eyes, nose, and mouth and wherein alternative components are provided for each of said additional regions.

3. The facial display system as defined in claim 2 wherein each of the alternative temples components are of one-piece construction, respectively.

4. The facial display system as defined in claim 2, wherein each of the alternative jawlines components are of one-piece construction, respectively.

5. The facial display system as defined in claim 2 wherein each of the alternative eyes components are of one-piece construction, respectively.

6. The facial display system as defined in claim 1 wherein said at least seven classic face shapes comprise round, oval, square, oblong, triangle, inverted triangle and diamond.

7. The facial display system as defined in claim 6 wherein at least some of said forehead, temples, cheeks and jawline components are common to more than one of the said at least seven classic face shapes.

8. The facial display system as defined in claim 7 wherein said system comprises two alternative forehead components, five alternative temples components, six alternative eyes components, three alternative cheeks components, and five jawlines components.

9. The facial display system as defined in claim 8 and further including six alternative nose components, six alternative eyes components, four alternative mouth components and four sets of eyebrow components.

10. The facial display system as defined in claim 1 and wherein each of said components is constructed of a rubbery polymer.

11. The facial display system according to claim 10 wherein said rubbery polymer comprises silicone rubber.

12. The facial display system defined in claim 1 wherein at least some said components are provided with projections adapted for insertion into one or more corresponding openings or depressions provided in said skull base.

13. A facial display system as defined in claim 7 wherein peripheral side edges of alternative components for any one of said regions are substantially identical, so that substantially all of the components are interchangeable, thereby enabling the creation of hybrid facial displays in addition to the seven classic face shapes.

14. A three dimensional facial display system comprising:
- a self supporting skull base having a general shape of a human head, and including a forward facial portion and a rearward portion, said forward facial portion being offset from said rearward portion by wall means, and said forward facial portion formed with a contoured support surface;
- a plurality of three dimensional facial display components, each of which has a front surface and a back surface, the back surfaces of at least some of said components adapted for mounting directly on said forward facial portion, and
- the back surfaces of other of said components adapted for at least partial mounting on underlying recessed portions of adjacent components.

15. The three dimensional facial system of claim 14 and wherein a plurality of said components are provided which correspond to various regions of the face including forehead, temples, eyes, cheeks, nose, mouth and jawlines; and further wherein sufficient components are provided for alternative and interchangeable mounting on said skull base to enable the creation of at least seven face shapes including round, oval, square, oblong, triangle, inverted triangle and diamond.

16. The facial display system of claim 15 wherein each eyes component includes a recessed connecting portion for partially supporting a nose component.

17. The facial display system of claim 15 wherein each cheeks component includes a recessed connecting portion for partially supporting a nose component.

18. The facial display system of claim 15 wherein each jawlines component includes a recessed surface for supporting a mouth component.

* * * * *